US010309081B2

(12) United States Patent
Inukai et al.

(10) Patent No.: US 10,309,081 B2
(45) Date of Patent: Jun. 4, 2019

(54) CONSTRUCTION MACHINE

(71) Applicant: Hitachi Construction Machinery Co., Ltd., Taito-ku, Tokyo (JP)

(72) Inventors: Takuya Inukai, Ibaraki (JP); Yasuhiko Yoshino, Ibaraki (JP); Masao Kariya, Ibaraki (JP); Kazuhiko Mizoguchi, Ibaraki (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 0 days.

(21) Appl. No.: 15/754,426

(22) PCT Filed: Oct. 3, 2016

(86) PCT No.: PCT/JP2016/079274
§ 371 (c)(1),
(2) Date: Feb. 22, 2018

(87) PCT Pub. No.: WO2017/061372
PCT Pub. Date: Apr. 13, 2017

(65) Prior Publication Data
US 2018/0238021 A1 Aug. 23, 2018

(30) Foreign Application Priority Data
Oct. 6, 2015 (JP) ................. 2015-198861

(51) Int. Cl.
E02F 9/08 (2006.01)
B60K 11/02 (2006.01)
(Continued)

(52) U.S. Cl.
CPC ............ E02F 9/0866 (2013.01); B60K 11/02 (2013.01); E02F 3/32 (2013.01); E02F 9/00 (2013.01);
(Continued)

(58) Field of Classification Search
CPC ......... E02F 9/00; E02F 9/0866; E02F 9/0891; E02F 3/32; B60K 11/02; F01N 13/008; F01N 2560/06; F02B 77/00; F02D 41/00
(Continued)

(56) References Cited

U.S. PATENT DOCUMENTS 8,365,518 B2 * 2/2013 Ezawa ............... B01D 46/0002
55/DIG. 30
9,212,465 B2 * 12/2015 Miyachi ............... E02F 9/0866
(Continued)

FOREIGN PATENT DOCUMENTS

JP 2012-184602 A 9/2012
JP 2014-29157 A 2/2014
(Continued)

OTHER PUBLICATIONS

Machine translation of JP2015-105551. (Year: 2015).*
(Continued)

Primary Examiner — John D Walters
(74) Attorney, Agent, or Firm — Crowell & Moring LLP

(57) ABSTRACT

A construction machine according to the present invention includes electric components 20 and a cover member 21, and includes an inflow side opening 25 that allows cooling air generated by the cooling fan 16 to flow therein, and an outflow side opening 26 that allows the cooling air flowing in from the inflow side opening 25 to flow out, in which the cover member 21 is formed such that the inflow side opening 25 expands toward an upstream side of a flow of the cooling air with respect to a space formed between the cover member 21 and the post-treatment device 17, and having the electric components 20 therein, and a space between the post-treatment device 17 and the cover member 21 narrows from the inflow side opening 25 toward the outflow side opening 26.

5 Claims, 3 Drawing Sheets

(51) Int. Cl.
  *E02F 9/00* (2006.01)
  *F02B 77/00* (2006.01)
  *F02D 41/00* (2006.01)
  *E02F 3/32* (2006.01)
  *F01N 13/00* (2010.01)

(52) U.S. Cl.
  CPC ............ *F01N 13/008* (2013.01); *F02B 77/00* (2013.01); *F02D 41/00* (2013.01); *E02F 9/0891* (2013.01); *F01N 2560/06* (2013.01)

(58) Field of Classification Search
  USPC .......................................................... 180/309
  See application file for complete search history.

(56) References Cited

U.S. PATENT DOCUMENTS

| 2011/0000199 | A1 | 1/2011 | Ezawa et al. |
| 2015/0211210 | A1 | 7/2015 | Miyachi et al. |
| 2017/0009639 | A1 | 1/2017 | Mitsuda et al. |

FOREIGN PATENT DOCUMENTS

| JP | 2015-105551 A | 6/2015 |
| JP | 2015-140156 A | 8/2015 |
| WO | WO 2008/136203 A1 | 11/2008 |
| WO | WO 2010/004805 A1 | 1/2010 |
| WO | WO 2015/141499 A1 | 9/2015 |

OTHER PUBLICATIONS

International Search Report (PCT/ISA/210) issued in PCT Application No. PCT/JP2016/079274 dated Dec. 20, 2016 with English-language translation (five (5) pages).

Japanese-language Written Opinion (PCT/ISA/237) issued in PCT Application No. PCT/JP2016/079274 dated Dec. 20, 2016 (four (4) pages).

* cited by examiner

CONSTRUCTION MACHINE

TECHNICAL FIELD

The present invention relates to a construction machine such as a hydraulic excavator including a post-treatment device that purifies exhaust gas of an engine.

BACKGROUND ART

This type of conventional technology is disclosed in Patent Literature 1. This conventional technology is a construction machine such as a hydraulic excavator, and in order to easily and reliably perform mounting work of a vibrationproof member of a post-treatment device, electric wiring work, and the like, which require time and labor, a post-treatment device assembly is configured by a support member composed of a separate member from a vehicle body, and a post-treatment device assembled to the support member through the vibrationproof member, and this post-treatment device assembly is mounted on the vehicle body by using the support member.

CITATION LIST

Patent Literature

Patent Literature 1: International Publication No. WO2008/136203

SUMMARY OF INVENTION

Technical Problem

Recently, in the hydraulic excavator or the like, in order to respond to exhaust gas regulation, a large post-treatment device, and a support member for fixing the post-treatment device or electric components such as a sensor necessary for exhaust system control are unavoidably added. In the hydraulic excavator, electric components are sometimes disposed near the post-treatment device due to restriction of a narrow vehicle body space of the hydraulic excavator. For example, in Patent Literature 1, electric components are mounted on a support member configuring a post-treatment device assembly.

Generally, during vehicle body operation, the temperature of the post-treatment device becomes high. However, in the hydraulic excavator, a space around the post-treatment device becomes narrow due to increase in size of the post-treatment device installed in a restricted vehicle body space, addition of the support member of the post-treatment device, and the like. Consequently, the atmospheric temperature around the post-treatment device tends to become high. In such a hydraulic excavator, when electric components such as a sensor are disposed near the post-treatment device, there is a risk that failure or malfunction of the electric components such as the sensor occurs due to thermal influence from the post-treatment device whose temperature becomes high.

In the conventional technology disclosed in the above Patent Literature 1, coping with placement of the electric components such as the sensor near the post-treatment device, and thermal influence on the disposed electric components such as the sensor received from the post-treatment device is not considered.

In order to solve the above problem, an object of the present invention is to provide a construction machine, in which electric components provided in a post-treatment device can be efficiently cooled.

Solution to Problem

In order to solve the above problem, a construction machine according to the present invention includes: a main body; a working device that is mounted on the main body; an engine that is provided in the main body; a cooling fan that is provided in the main body; and a post-treatment device that is provided in the main body, and purifies exhaust gas of the engine, the construction machine including: electric components that are disposed in the post-treatment device; a cover member that is provided above the post-treatment device, and covers the electric components; an inflow side opening that is provided in a first end of the cover member located on an upstream side of a flow of cooling air generated by the cooling fan, and allows the cooling air to flow therein; an inflow side guide section that smoothly guides the cooling air flowing in from the inflow side opening to inside of the cover member, and is provided in the cover member; and an outflow side opening that is provided in a second end of the cover member located on a downstream side of the flow of the cooling air, and allows the cooling air flowing in from the inflow side opening to flow out, in which the cover member is formed such that the inflow side guide section expands toward the upstream side of the flow of the cooling air with respect to a space formed between the cover member and the post-treatment device, and having the electric components therein, and a space between the post-treatment device and the cover member is formed so as to narrow from the inflow side opening toward the outflow side opening.

Advantageous Effect of Invention

In the construction machine according to the present invention, the cover member that covers the electric components is formed above the post-treatment device such that the inflow side guide section expands toward the upstream side of the flow of the cooling air with respect to the space formed between the cover member and the post-treatment device, and having the electric components therein, and the space between the post-treatment device and the cover member is formed so as to narrow from the inflow side opening toward the outflow side opening, and therefore it is possible to bring the cooling air generated by the cooling fan into contact with the electric components at a high speed to efficiently cool the electric components provided in the post-treatment device. Consequently, in the present invention, it is possible to efficiently cool the electric components even in a case where the electric components are provided in the post-treatment device.

In the present invention, deposits such as leaves of trees and sawdust that deposit on the post-treatment device can be blown off by the cooling air flowing out from the outflow side opening to be removed. That is, in the present invention, the deposits on the post-treatment device can be prevented from being ignited by the heated post-treatment device.

The cover member provided in the present invention can be formed in a simple shape, and can be easily mounted. Consequently, in the present invention, it is possible to keep the production cost accompanying the provision of the cover member down.

The electric components provided in the present invention are collectively fixed near the post-treatment device. Consequently, it is possible to minimize a vehicle body space necessary for installation of electric components.

DESCRIPTION OF EMBODIMENTS

Hereinafter, an embodiment of a construction machine according to the present invention will be described with reference to the drawings.

Figure 1:
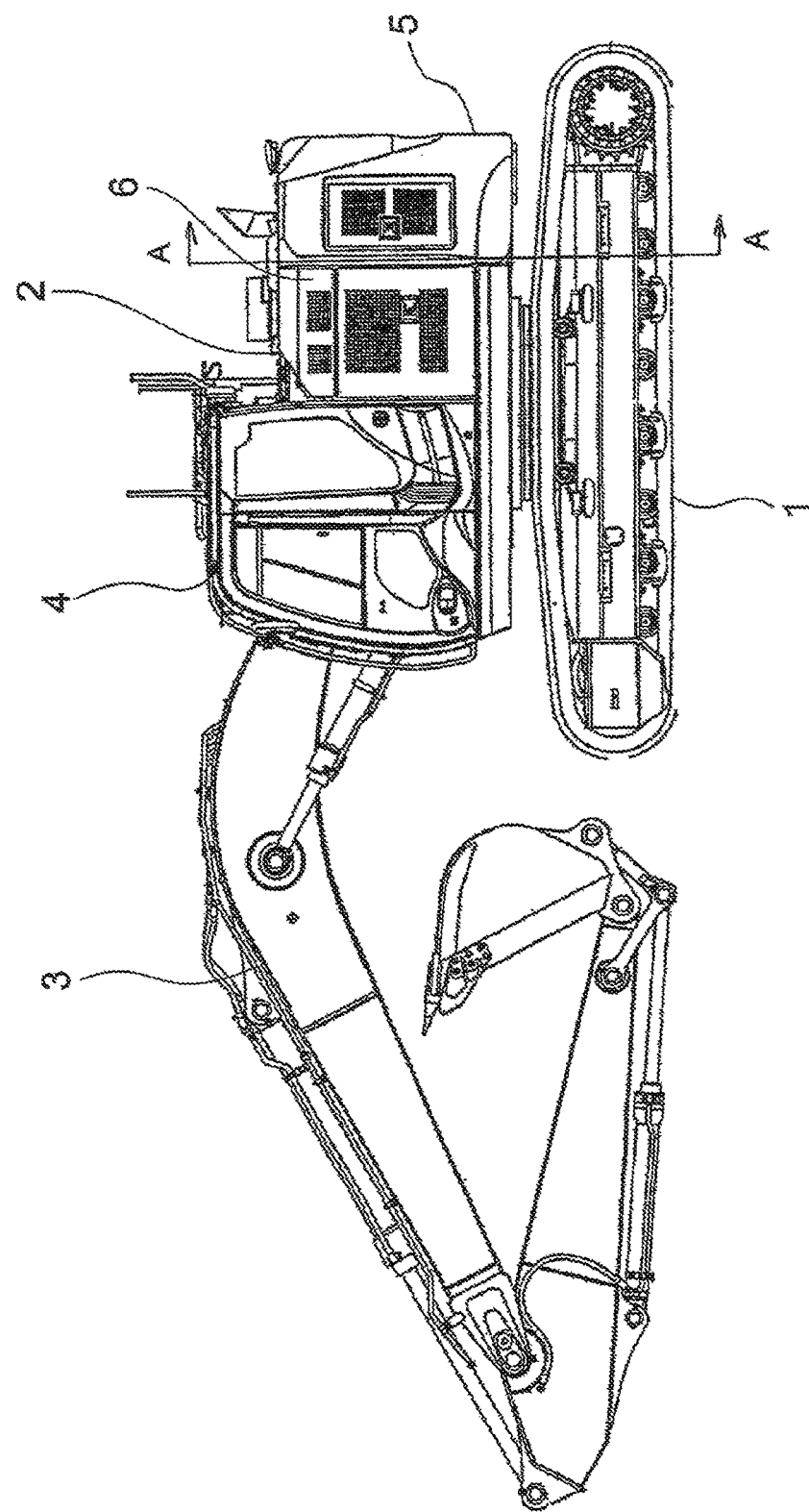
FIG. 1 is a side view illustrating a hydraulic excavator shown as an example of a construction machine according to the present invention.

As illustrated in FIG. 1, a construction machine according to an embodiment of the present invention is composed of, for example, a hydraulic excavator. This hydraulic excavator includes a travel base 1, an upperstructure 2 that is disposed on this travel base 1, and forms a main body, and a working device 3 that is mounted on this upperstructure 2 so as to be rotatable in the vertical direction, and performs excavation work of earth and sand, or the like.

An operator's cab 4 is disposed at a front position on the upperstructure 2. A counter weight 5 that secures weight balance is disposed at a rear position. An engine room 6 is disposed between the operator's cab 4 and the counter weight 5.

Figure 2:
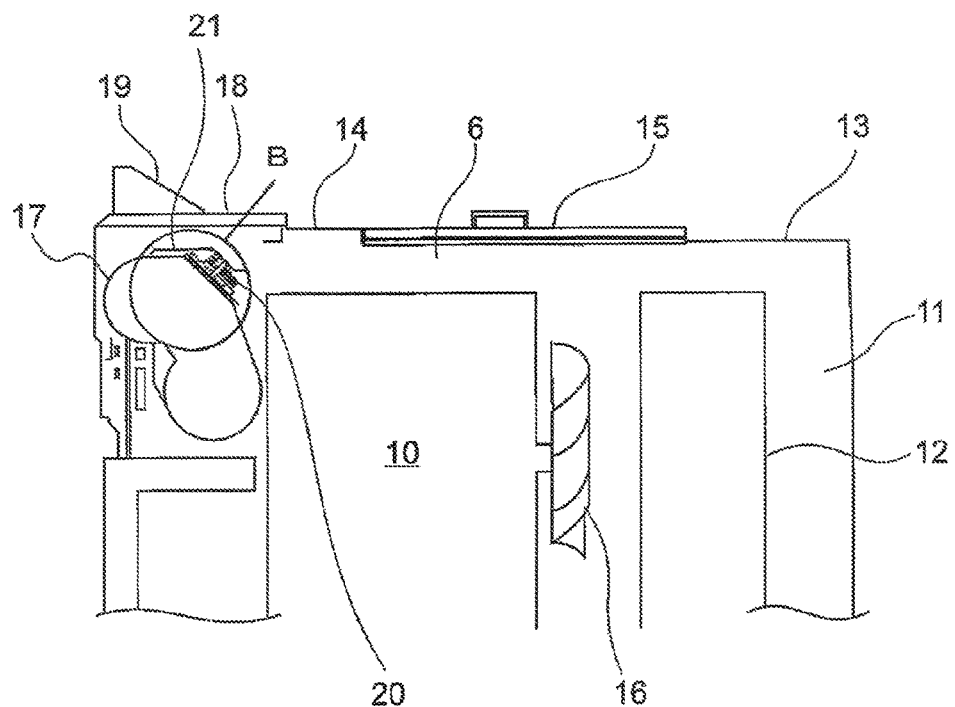
FIG. 2 is a sectional side view illustrating main components disposed on an upperstructure provided in this embodiment, viewed from the A-A direction in FIG. 1.

As illustrated in FIG. 2, on the upperstructure 2, a heat exchanger chamber 11 is disposed adjacent to the engine room 6 that stores an engine 10. In this heat exchanger chamber 11, a heat exchanger 12 such as a radiator is stored. An upper cover 13 that covers this heat exchanger chamber 11 is provided above the heat exchanger chamber 11.

Above the engine room 6, an upper cover 14 that covers this engine room 6 is provided. Additionally, there is provided an opening/closing door 15 that opens and closes an opening for maintenance formed in the upper cover 14.

A cooling fan 16 that generates, as cooling air, outside air introduced in from the outside of the vehicle body in order to cool cooling water and the like flowing inside the heat exchanger 12 is disposed between the heat exchanger 12 and the engine 10.

A post-treatment device 17 that purifies exhaust gas of the engine 10 is disposed inside the engine room 6. An upper cover 18 capable of covering an opening for maintenance of this post-treatment device 17 is provided above this post-treatment device 17. In this upper cover 18, a duct 19 that exhausts heated air in the engine room 6 to the outside of the upperstructure 2 is provided.

Figure 3:
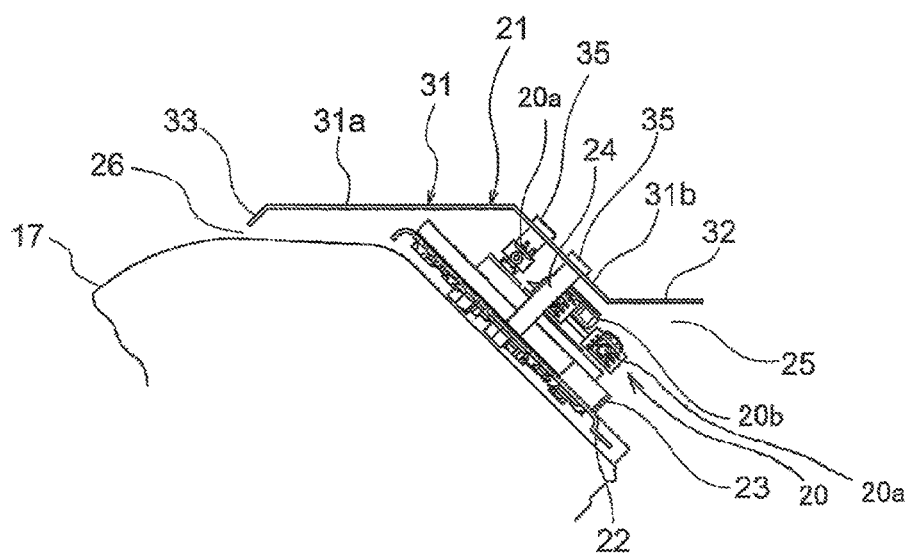
FIG. 3 is an enlarged view of a main section of B in FIG. 2 of this embodiment.

As illustrated in FIG. 2 and FIG. 3 electric components 20 composed of a sensor 20a that is disposed in the post-treatment device 17 in order to control an exhaust system, and detects the temperature inside the post-treatment device 17, an amount of NOx contained in exhaust gas, and the like, a controller 20b that performs conversion of an output signal from the sensor 20a, and the like, and a cover member 21 that is provided above the post-treatment device 17, and covers the electric components 20 are provided.

The cover member 21 is formed in a shape along an arrangement form of the electric components 20. For example, this cover member 21 includes a main body section 31 having a horizontal section 31a and an inclined section 31b, an inflow side guide section 32 that is provided in a first end side of this main body section 31, and smoothly guides cooling air generated by the cooling fan 16 to the inside of the cover member 21, and an outflow side guide section 33 that is provided in a second end side of the main body section 31, and smoothly guides the cooling air flowing into the cover member 21 to the outside of the cover member 21. The inflow side guide section 32 is provided so as to expand to the upstream side of the cooling air with respect to a space formed between the inclined section 31b of the cover member 21 and the post-treatment device 17 and having the electric components 20, so that more cooling air is smoothly guided between the cover member 21 and the post-treatment device 17.

The cover member 21 is composed of, for example, a single plate. The horizontal section 31a and the inclined section 31b composing the main body section 31 of this cover member 21 is formed by being folded at a folding line 31c. The inflow side guide section 32 is formed by being horizontally folded from the inclined section 31b of the main body section 31. The outflow side guide section 33 is formed by being obliquely folded from the horizontal section 31a of the main body section 31.

The cover member 21 has heat radiation openings 36 for radiating heat in the cover member 21 and heat confined between the post-treatment device 17 and the cover member to the outside of the cover member 21 when the engine 10 is stopped. For example, the two heat radiation openings 36 are provided, and these heat radiation openings 36 are disposed at the position of the folding line 31c of the main body section 31.

As illustrated in FIG. 3, this embodiment includes an inflow side opening 25 that is provided in a first end of the cover member 21 located on the upstream side of the flow of cooling air, and allows the cooling air generated in the cooling fan 16 to flow therein, and an outflow side opening 26 that is provided in a second end of the cover member 21 located on the downstream side of the flow of the cooling air, and allows the cooling air flowing in from the inflow side opening 25 to flow out. A space between the post-treatment device 17 and the cover member 21 is set so as to narrow from the inflow side opening toward the outflow side opening. That is, the flow of the cooling air is restricted from the inflow side opening 25 toward the outflow side opening 26, so that the wind speed is increased.

Figure 4:
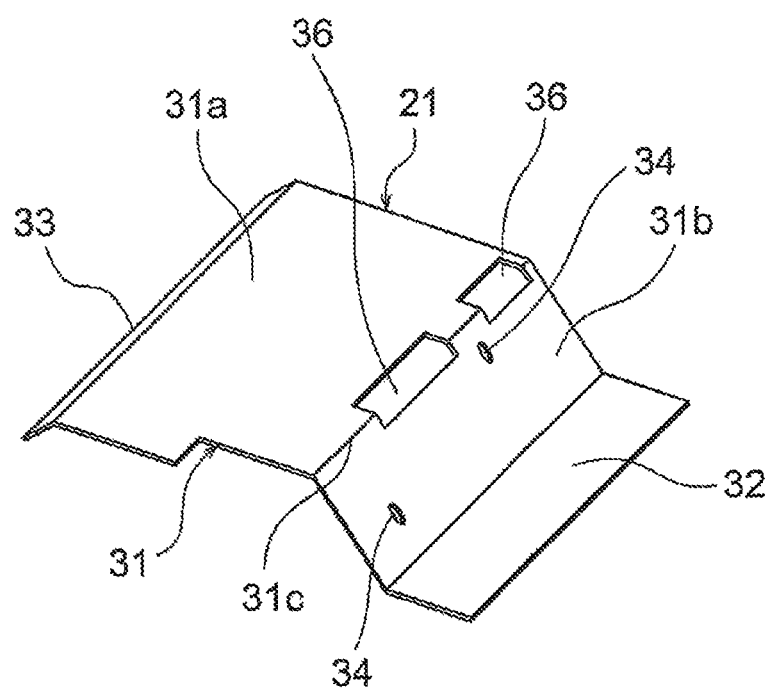
FIG. 4 is a perspective view illustrating a cover member provided in this embodiment.

As illustrated in FIG. 3, in this embodiment, the above electric components 20 are held by a bracket 23 fixed to a mounting member 22 provided in the post-treatment device 17. Additionally, this embodiment includes, for example, two support members 24 that are fixed to the mounting member 22, and two bolts 35 that are inserted into respective two holes 34 formed in the cover member 21 and illustrated in FIG. 4 to be screwed into respective screw sections formed in the support members 24, and fasten the cover member 21 to the support members 24.

Fixing sections that fix the cover member 21 to the respective support members 24 are configured by the above two bolts 35, the two holes 34 formed in the cover member 21, and the screw sections formed in the two support members 24 and screwed to the respective bolts 35.

In this embodiment thus configured, when the cooling fan 16 is operated with driving of the engine 10, and outside air is introduced by this cooling fan 16, so that cooling air is generated, cooling water and the like flowing in the heat exchanger 12 of the heat exchanger chamber 11 is cooled by the cooling air, and the cooling air is further guided to the engine room 6. In the vicinity of the cover member 21, the cooling air guided to the engine room 6 mainly flows from the inflow side opening 25 to the inside of the cover member 21, and flows from the outflow side opening 26 to the outside of the cover member 21.

At this time, the inflow side guide section 32 is set so as to expand toward the upstream side of the cooling air with respect to the space formed between the inclined section 31b of the cover member 21 and the post-treatment device 17 and having the electric components 20, and the space between the post-treatment device 17 and the cover member 21 is set so as to narrow from the inflow side opening 25 toward the outflow side opening 26, and therefore the cooling air is smoothly guided between the cover member 21 and the post-treatment device 17, and the flow of the cooling air is restricted from the inflow side opening 25 toward the outflow side opening 26, so that the wind speed is increased. Consequently, the cooling air guided into the cover member 21 comes into contact with the electric components 20 at a high speed.

Thus, in the hydraulic excavator according to this embodiment, it is possible to bring the cooling air into contact with the electric components 20 at a high speed to efficiently cool the electric components 20 provided near the post-treatment device 17. Consequently, in this embodiment, it is possible to efficiently cool the electric components 20 even in a case where the electric components 20 are provided near the post-treatment device 17. That is, in the present invention, it is possible to maintain a stable detection function of the electric components 20.

In this embodiment, even in a case where deposits such as leaves of trees and sawdust enter the engine room 6 from the duct 19 or the like provided in the upper cover 18, and are generated on the post-treatment device 17, these deposits can be blown off by the cooling air flowing out from the outflow side opening 26 at high wind speed to be removed. That is, in this embodiment, the deposits on the post-treatment device 17 can be prevented from being ignited by the post-treatment device 17 having a high temperature.

Furthermore, the cover member 21 provided in this embodiment is composed of a single plate and has a simple configuration, and can be easily mounted on the support members 24 by the bolts 35. Consequently, in the present invention, it is possible to keep the production cost accompanying the provision of the cover member 21 down.

In this embodiment, the cover member 21 is formed in a shape along the arrangement form of the electric components 20, and therefore the space where the cover member 21 is disposed can be made to be a minimum space, and is suitable for a hydraulic excavator receiving restriction of component arrangement.

In this embodiment, the cover member 21 has the heat radiation openings 36, and therefore it is possible to radiate heat confined between the cover member 21 and the post-treatment device 17 to the outside of the cover member 21 when the engine 10 is stopped. Consequently, hot air can be prevented from keeping contact with the electric components 20.

In this embodiment, the cover member 21 can be stably held in the engine room 6 by the two support members 24 and the two bolts 35, and it is possible to implement a hydraulic excavator having high reliability.

In the above embodiment, the main body section 31 of the cover member 21 has the horizontal section 31a folded by the folding line 31c, and the inclined section 31b. However, the present invention is not limited to such a configuration.

The main body section 31 may be configured by a plate section curved along the arrangement form of the electric components 20.

In the above embodiment, the cover member 21 has the inflow side guide section 32 and the outflow side guide section 33. However, the cover member 21 only needs to be formed so as to expand toward the upstream side of the flow of cooling air with respect to the space formed between the cover member 21 and the post-treatment device 17, and having the electric components 20, and the space between the post-treatment device 17 and the cover member 21 only needs to narrow from the above inflow side opening 25 toward the above outflow side opening 26. The cover member 21 may be configured such that the inclined section 31b has the function of the inflow side guide section 32, and the horizontal section 31a has the function of the outflow side guide section 33 by changing the folding angles of the horizontal section 31a and the inclined section 31b composing the main body section 31 without providing the inflow side guide section 32 and the outflow side guide section 33.

The above embodiment is composed of the hydraulic excavator, but the present invention is not limited to application to the hydraulic excavator. That is, the present invention is applicable to any construction machine that includes a working device, and includes an engine provided on a main body, a cooling fan disposed on an upstream side with respect to a flow of cooling air, a post-treatment device disposed on a downstream side, and electric components disposed near the post-treatment device.

REFERENCE SIGNS LIST 2 upperstructure (main body)
3 working device
6 engine room
10 engine
16 cooling fan
17 post-treatment device
20 electric component
20a sensor (electric component)
20b controller (electric component)
21 cover member
22 mounting member
23 bracket
24 support member
25 inflow side opening
26 outflow side opening
31 main body section
31a horizontal section
31b inclined section
32 inflow side guide section
33 outflow side guide section
34 hole (fixing section)
35 bolt (fixing section)
36 heat radiation opening

The invention claimed is:
1. A construction machine comprising:
a main body;
a working device that is mounted on the main body;
an engine that is provided in the main body;
a cooling fan that is provided in the main body; and
a post-treatment device that is provided in the main body, and purifies exhaust gas of the engine, the construction machine comprising:
electric components that are disposed in the post-treatment device;

a cover member that is provided above the post-treatment device, and covers the electric components;

an inflow side opening that is provided in a first end of the cover member located on an upstream side of a flow of cooling air generated by the cooling fan, and allows the cooling air to flow therein;

an inflow side guide section that smoothly guides the cooling air flowing in from the inflow side opening to inside of the cover member, and is provided in the cover member;

an outflow side opening that is provided in a second end of the cover member located on a downstream side of the flow of the cooling air, and allows the cooling air flowing in from the inflow side opening to flow out;

a support member that is fixed to a mounting member disposed in the post-treatment device; and a fixing section that fixes the cover member to the support member, wherein the cover member is formed such that the inflow side guide section expands toward the upstream side of the flow of the cooling air with respect to a space formed between the cover member and the post-treatment device, and having the electric components therein, and a space between the post-treatment device and the cover member is formed so as to narrow from the inflow side opening toward the outflow side opening.

2. The construction machine according to claim 1, wherein a part of the cover member is formed in a shape along an arrangement form of the electric components.

3. The construction machine according to claim 1, wherein the cover member is composed of a single plate.

4. The construction machine according to claim 1, wherein the cover member has a heat radiation opening for radiating heat in the cover member to outside of the cover member when the engine is stopped.

5. The construction machine according to claim 1, wherein the electric components are collectively fixed to a mounting member provided in the post-treatment device through a bracket.

* * * * *